United States Patent [19]

Castleberry

[11] 4,212,048

[45] Jul. 8, 1980

[54] ILLUMINATOR FOR REFLECTIVE DICHROIC LIQUID CRYSTAL DISPLAYS

[75] Inventor: Donald E. Castleberry, Schenectady, N.Y.

[73] Assignee: General Electric Company, Schenectady, N.Y.

[21] Appl. No.: 916,137

[22] Filed: Jun. 16, 1978

[51] Int. Cl.² .......................... F21V 9/14; G02F 1/13; F21V 7/00
[52] U.S. Cl. ...................... 362/19; 350/338; 350/352; 362/301
[58] Field of Search .......... 362/19, 301, 339; 350/337, 338, 345, 352

[56] References Cited

U.S. PATENT DOCUMENTS

| | | | |
|---|---|---|---|
| 2,761,056 | 8/1956 | Lazo | 362/339 |
| 2,907,869 | 10/1959 | Hudson | 362/339 |
| 3,586,851 | 6/1971 | Rudolph | 362/301 |
| 3,924,932 | 12/1975 | Yamamoto | 350/337 |
| 3,947,091 | 3/1976 | Trcka | 350/345 |
| 3,984,176 | 10/1976 | Hirai | 350/345 |
| 4,011,001 | 3/1977 | Moriya | 362/19 |
| 4,017,155 | 4/1977 | Yagi | 362/19 |
| 4,033,672 | 7/1977 | Dalmasso | 350/345 |
| 4,118,110 | 10/1978 | Saurer | 350/345 |

Primary Examiner—Samuel W. Engle
Assistant Examiner—Donald P. Walsh
Attorney, Agent, or Firm—Geoffrey H. Krauss; James C. Davis; Marvin Snyder

[57] ABSTRACT

A device for illuminating, as well as enhancing contrast of, reflective dichroic liquid crystal displays utilizes a polarizing member extending across the thickness of a wedge illuminator. The light emitted from the wedge illuminator is polarized in a single direction, perpendicular to the elongated direction of the dichroic dye molecules in the light-transmitting areas of the display cell.

3 Claims, 3 Drawing Figures

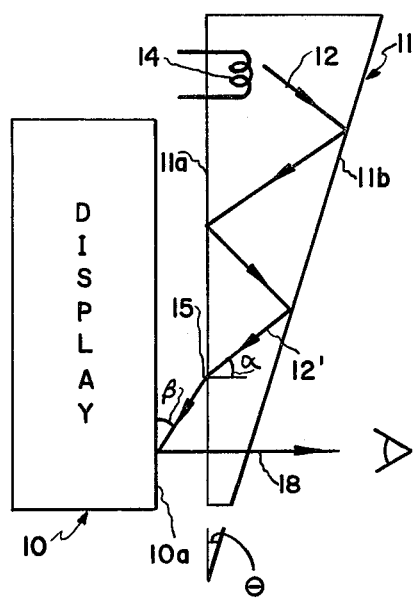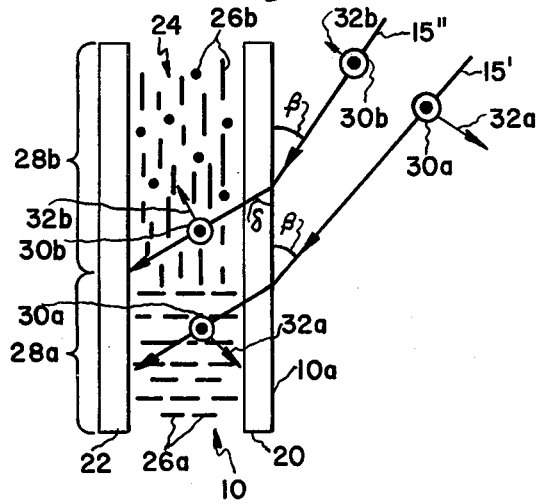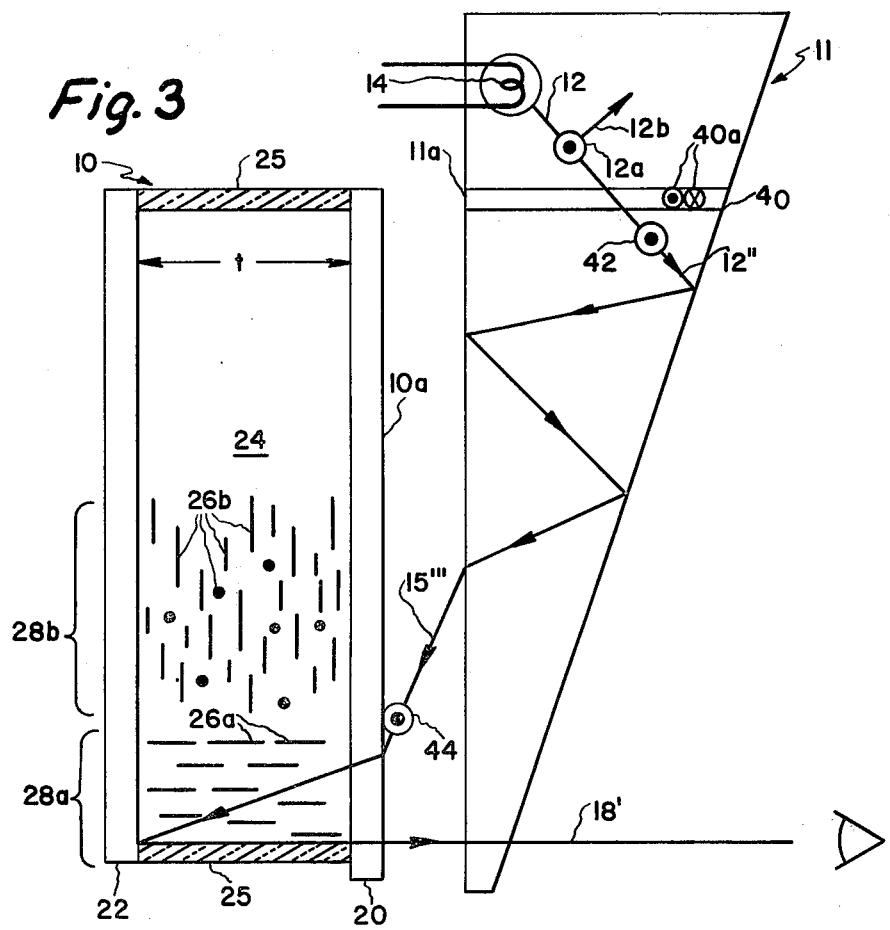

ILLUMINATOR FOR REFLECTIVE DICHROIC LIQUID CRYSTAL DISPLAYS

BACKGROUND OF THE INVENTION

The present invention relates to illuminators for facilitating use of displays in low ambient light conditions and, more particularly, to a novel wedge illuminator with polarizing member for illuminating and enhancing the contrast ratio of reflective dichroic liquid crystal displays.

Reflective displays are often attractive for data presentation. However, in low ambient light conditions, such as at night, it is well-known that artificial light sources such as lamps and the like, must be utilized to provide illumination of the front of the display to obtain the reflected light patterns transmitting the desired information read-out. In applications where minimum space, in front of the display, is available for positioning light souces, front illuminators may utilize a wedge-shaped light-transmissive member guiding the light from the source to the front of the display by total internal reflection. Previous attempts to apply wedge illuminators to reflective dichroic liquid crystal displays (which displays are particularly desirable because of the relatively low power consumption thereof) have resulted in relatively low contrast ratios and relatively dim displays. It is desirable to provide wedge illuminators for reflective dichroic liquid crystal displays, wherein the brightness and contrast ratio of the display are relatively greater than presently possible.

BRIEF DESCRIPTION OF THE INVENTION

In accordance with the invention, a wedge illuminator member of a light-transmissive material is positioned with its rear surface substantially parallel to the front surface of a dichroic liquid crystal display. A light source in the wedge illuminator is acted upon by a polarizing member disposed across the thickness of the illuminator member to cause all light emitted from the wedge illuminator toward the front of the reflective display cell to be polarized parallel to the display front surface. The magnitude of the reflectivity of the light-transmissive areas of the display is increased, while the degree of light-absorption in the remaining areas of the display is increased, whereby a bright, high contrast ratio display is achieved.

Accordingly, it is an object of the present invention to provide a novel wedge illuminator for use with reflective dichroic liquid crystal display cells to enhance both brightness and contrast ratio of the display.

This and other objects of the present invention will become apparent upon consideration of the following detailed description taken in conjunction with the drawings.

BRIEF DESCRIPTION OF THE DRAWINGS

FIG. 1 is a schematic side view of a prior art wedge illuminator and display configuration;

FIG. 2 is a schematic side view of an illuminated liquid crystal display cell, and useful in understanding the principles of the present invention; and FIG. 3 is a side view of a novel illuminator for a reflective dichroic liquid crystal display, in accordance with the principles of the present invention.

DETAILED DESCRIPTION OF THE INVENTION

Referring initially to FIG. 1, a reflective display 10 is illuminated by a prior art illuminator 11, formed of a wedge of a light transmissive material having an index of refraction such that light rays 12, emitted from a light source 14, are guided down the wedge by total internal refraction at the wedge-air interfaces occurring at the rear and front surfaces 11a and 11b, respectively. As is well-known, the incidence angle of light ray 12 upon the glass-air interface (the wedge surface) is decreased, at each reflection, by the wedge angle $\theta$; the reflected ray 12' eventually strikes the rear surface 11a of the wedge at an angle $\alpha$ less than the critical angle and escapes from the wedge illuminator. The emitted light ray 15 passes across the intervening distance between wedge rear surface 11a and a display front surface 10a substantially parallel thereto, and strikes display surface 10a at some grazing angle $\beta$. The light ray 15 is absorbed by display 10 and is selectively reflected therefrom as a light ray 18, which ray 18 passes through the wedge illuminator and is visible by an observer stationed in front of the display-illuminator combination.

Previous attempts to apply such "grazing angle" wedge illumination to liquid crystal displays of the reflective type, wherein the liquid crystal medium contains a guest dichroic dye, have resulted in relatively low contrast. Considering now FIG. 2, I believe the resulting low contrast to be explainable by consideration of the absorption of polarized light in display 10. The display cell 10 is of well-known construction, having a substantially transparent front substrate 20 parallel to, and spaced from, a reflective rear substrate 22. A quantity of a liquid crystal material 24 fills the volume between the substrates and is maintained therein by sealing means 25 (FIG. 3). A guest dichroic dye is dissolved in the host liquid crystal material and the elongated axes 26a and 26b of the dye molecules (aligned parallel to the elongated liquid crystal molecules) are aligned by known techniques, to be either perpendicular (molecular axes 26a) to the facing interior surfaces of the planar substrates, to allow a high degree of reflection of the light ray 15' impingent upon cell area 28a, or to be substantially in a plane parallel (molecular axes 26b) to the facing interior surfaces of the substrates with the elongated axes pointing in random directions in that plane (as shown by the different lengths projected on the plane of the drawing, i.e. transverse to the plane of the cell surfaces) to cause a relatively greater degree of absorption of another ray 15" impingent upon cell area 28b associated with the dye molecules which are disposed parallel to the cell surfaces.

The light emitted from source 14 (FIG. 1) is randomly polarized, whereby either of light rays 15' and 15", emitted from the wedge illuminator and striking the display front surface 10a at grazing angle $\beta$, is composed of a first component having a polarization vector 30a or 30b orthogonal to the direction of travel of the light ray and parallel to the cell surface, and a second component having a second polarization vector 32a and 32b, orthogonal both to the direction of travel of light ray 15' or 15" and to the associated first polarization vector 30a or 30b.

The light ray 15' impinges upon the reflective, or "on", area 28 and encounters the dye molecules 26a with first polarization vector 30a orthogonal to the elongated molecular axes, whereby relatively little absorption of the light having first polarization vector 30a occurs. However, as second polarization vector 32a is not oriented orthogonal to the molecular axes of the guest dichroic dye molecules, a relatively strong absorption of this polarized component of light ray 15' occurs. The relatively strong absorption of a portion of light impingent upon a cell area 28a (which should have a highly reflective property and should therefore produce a clear, high-contrast reflection), results in a somewhat dimmer reflection due to the absorption, whereby a relatively low-brightness appearance for area 28a is seen. The light ray 15" impingent upon the normally-absorbing, or "off", area 28b has its first component with polarization vector 30b parallel to only a portion of the dye molecule axes, whereby relatively low absorption of light having this first polarization vector, occurs. The second polarization vector 32b is not orthogonal to the elongated direction of the molecular axes 26b, and substantial absorption of light having second polarization vector 32b occurs. It will be seen that, in both the "on" and "off" areas 28a and 28b, respectively, relatively low absorption of light components with polarization vector 30a or 30b, occurs; relatively strong absorption of light with orthogonal polarization vector 32a or 32b, also occurs and a dim, low-contrast display results.

Referring now to FIG. 3, wherein like reference designations are utilized for like elements, I have found that inclusion of a polarizing member 40, across the thickness of the entire illuminator at a point chosen to prevent blocking of light reflected from display front surface 10a, and preferably positioned substantially perpendicular to rear illuminator surface 11a, serves to produce a bright, high-contrast reflective display assembly. Polarizing member 40 is positioned such that its polarization vectors 40a (illustratively, into and out of the plane of the drawing in FIG. 3) are parallel to illuminator rear surface 11a and to display front surface 10a. The polarizing member is positioned within the wedge immediately below light source 14, such that all light rays 12, of random polarization and having a first polarization vector 12a parallel to polarization vectors 40a and a second polarization vector 12b orthogonal to first polarization vector 12a and to the direction of light ray 12 travel, must pass through polarization member 40 prior to internal reflection and subsequent emission from illuminator wedge 11. Thus, after passage through polarizing member 40, light rays 12" are unidirectionally polarized, with a polarization vector 42 parallel to the polarization vectors 40a of the polarizing member (e.g. into and out of the plane of the drawing). Hence, the emitted light ray 15''' has a similar polarization vector 44 which is parallel to the display front surface 10a. The dye molecules 26a, in "on" region 28a, are illuminated with light having polarization vector 44 orthogonal to the elongated direction of the molecular axes and minimal absorption occurs; the magnitude of reflected ray 18' is maximal. In "off" area 28b, the entering light ray also has polarization vector 44 parallel to the display front surface 10a and into and out of the plane of the drawing, which polarization is parallel to at least a portion of dye molecules 26b, having random orientations in a plane parallel to display front surface 10a. Accordingly, relatively large absorption of all of the light entering area 28b occurs and substantially no light is reflected from this "off" area. Hence, the "on" areas are relatively bright and the "off" areas are relatively dim and the display exhibits a higher contrast ratio between "on" and "off" areas than the prior art display of FIG. 1.

Theoretically, if the dichroic dye molecules have substantially no absorption for light polarized perpendicular to their elongated molecular axes, and if the dye molecules are, as previously mentioned hereinabove, oriented randomly in a plane parallel to the cell walls in the "off" state, then it can be shown that, for the case where incident light passes through the cell with an angle $\delta$ (FIG. 2) of about 45° relative to the display front surface 10a and if the display is viewed normal to that surface, the contrast ratio can be almost doubled. For a contrast ratio CR defined as the ratio of light transmission in the "on" condition ($T_{ON}$) to the light transmission in the "off" condition ($T_{OFF}$), the contrast ratio for the prior art case is given by:

$$CR = (1 + e^{-at})/(e^{-at(\sqrt{2}+1)/2} + e^{-at})$$

where t is the cell thickness and a is the dichroic dye absorption coefficient parallel to the elongated molecular axes. For the case where the dichroic liquid crystal display is illuminated by my novel wedge illuminator with polarizer, the contrast ratio is given by:

$$CR = e^{+at}(\sqrt{2}+1)/2.$$

Illustratively, if the quantity ($e^{-at}$) is equal to ¼, then the contrast ratio of the prior art illuminator is about 2.8 and the contrast ratio of my novel wedge illuminator with polarizer is about 5.3. Although this analysis is a simple approximation of a real display, similar large enhancements of contrast ratio are achievable in practice.

While the present invention has been described with reference to one preferred embodiment thereof, many modifications and variations will now become apparent to those skilled in the art. It is my intent, therefore, to be limited only by the scope of the appending claims and not by the specifics of the single embodiment disclosed herein.

What is claimed is:

1. An illuminator for a reflective dichroic liquid crystal display cell having a planar front surface of predetermined length, said illuminator comprising:

a wedge of light transmissive material having a rear surface disposed adjacent and substantially parallel to, and of length greater than and overlying the length of, the planar front surface of said display cell;

means disposed within the thicker end of said wedge illuminator member for emitting light rays with random polarization and ramdom emission direction;

said randomly-emitted light rays emerging from said wedge illuminator member rear surface at random distances along the length thereof and obliquely entering the front surface of said display cell; and means positioned within a portion of said thicker member end so as to avoid interference with light reflected from the said display cell front surface for polarizing the light rays emitted from said wedge illuminator to have a polization vector parallel to the plane of said display front surface, to enhance the contrast ratio between light reflected from areas of said display cell respectivey substantially reflecting and substantially absorbing said rays.

2. The illuminator as set forth in claim 1, wherein said polarizing means is a polarization member disposed within said wedge illuminator member and having a polarization vector essentially parallel to the plane of said wedge illuminator member rear surface.

3. The illuminator as set forth in claim 2, wherein said polarization member is planar and is disposed substantially perpendicular to the plane of said wedge illuminator member rear surface.

* * * * *